US010944948B2

(12) United States Patent
Kamiya et al.

(10) Patent No.: US 10,944,948 B2
(45) Date of Patent: *Mar. 9, 2021

(54) IMAGING APPARATUS, IMAGING SYSTEM, AND IMAGING METHOD

(71) Applicant: SONY CORPORATION, Tokyo (JP)

(72) Inventors: Koji Kamiya, Kanagawa (JP);
Norihiko Kawada, Kanagawa (JP);
Yuki Matsuoka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/553,626

(22) PCT Filed: Mar. 30, 2016

(86) PCT No.: PCT/JP2016/001831
§ 371 (c)(1),
(2) Date: Aug. 25, 2017

(87) PCT Pub. No.: WO2016/163102
PCT Pub. Date: Oct. 13, 2016

(65) Prior Publication Data
US 2018/0054603 A1 Feb. 22, 2018

(30) Foreign Application Priority Data
Apr. 8, 2015 (JP) .............................. JP2015-079232

(51) Int. Cl.
*H04N 9/00* (2006.01)
*H04N 9/64* (2006.01)
(Continued)

(52) U.S. Cl.
CPC ............... *H04N 9/73* (2013.01); *H04N 1/488* (2013.01); *H04N 1/6019* (2013.01);
(Continued)

(58) Field of Classification Search
CPC .................................................. H04N 9/04513
(Continued)

(56) References Cited

U.S. PATENT DOCUMENTS 8,542,246 B2 * 9/2013 Saigo .................... G06T 11/001
345/590
9,854,136 B2 * 12/2017 Doser ...................... G09G 5/02
(Continued)

FOREIGN PATENT DOCUMENTS

JP 2003-87587 A 3/2003
JP 2007-13578 A 1/2007
(Continued)

OTHER PUBLICATIONS

David Fox, "SVG New Camera Analysis: Two-thirds of the way to practical 4K Ultra HD for sports," Sports Video Group Europe, XP055283267, Oct. 7, 2014, (7 pages).
(Continued)

*Primary Examiner* — Anthony J Daniels
(74) *Attorney, Agent, or Firm* — Oblon, McClelland, Maier & Neustadt, L.L.P.

(57) ABSTRACT

There is provided a signal processor including correction circuitry configured to correct a signal for each color input to the signal processor and to output the corrected signal for each color, first conversion circuitry configured to receive the corrected signal for each color, to perform first image processing on each corrected signal for each color, and to generate a first signal having a first color gamut for each color, second conversion circuitry configured to receive the corrected signal for each color, to perform second image processing on each corrected signal for each color, and to generate a second signal having a second color gamut for each color, where the signal processor outputs a first image data having a first color gamut and a second image data
(Continued)

having a second color gamut from same corrected signals for each color.

19 Claims, 19 Drawing Sheets

(51) Int. Cl.
| | | |
|---|---|---|
| *H04N 9/73* | (2006.01) | |
| *H04N 1/48* | (2006.01) | |
| *H04N 1/60* | (2006.01) | |
| *H04N 1/64* | (2006.01) | |
| *H04N 9/69* | (2006.01) | |

(52) U.S. Cl.
CPC ............... *H04N 1/646* (2013.01); *H04N 9/64* (2013.01); *H04N 9/69* (2013.01); *H04N 2209/049* (2013.01)

(58) Field of Classification Search
USPC ............................................. 348/207.99–376
See application file for complete search history.

(56) References Cited

U.S. PATENT DOCUMENTS

| | | | | |
|---|---|---|---|---|
| 2002/0063788 | A1* | 5/2002 | Kurashige | H04N 5/23209 348/231.99 |
| 2008/0055333 | A1* | 3/2008 | Matsuoka | H04N 1/6058 345/600 |
| 2008/0166044 | A1* | 7/2008 | Pan | G06K 9/4652 382/167 |
| 2009/0147018 | A1* | 6/2009 | Takei | H04N 5/23293 345/590 |
| 2010/0302404 | A1* | 12/2010 | Mizukura | H04N 1/6058 348/222.1 |
| 2012/0306905 | A1* | 12/2012 | Kim | G09G 5/02 345/589 |
| 2013/0076672 | A1* | 3/2013 | Sirpal | G06F 3/1438 345/173 |
| 2014/0093182 | A1 | 4/2014 | Arai | |
| 2017/0061594 | A1* | 3/2017 | Suzuki | G06T 5/009 |
| 2017/0237962 | A1* | 8/2017 | Oh | H04N 11/06 348/474 |
| 2018/0352263 | A1* | 12/2018 | Francois | G09G 3/2003 |

FOREIGN PATENT DOCUMENTS

| | | | | |
|---|---|---|---|---|
| JP | 2007-97032 | A | 4/2007 | |
| JP | 2007-129610 | | 5/2007 | |
| JP | 2008-58650 | A | 3/2008 | |
| JP | 2009-33385 | A | 2/2009 | |
| JP | 2010-74212 | | 4/2010 | |
| JP | 2011-239061 | A | 11/2011 | |
| JP | 2012049870 | A * | 3/2012 | ............ H04N 5/225 |
| JP | 2012-165474 | A | 8/2012 | |
| JP | 2012-221238 | A | 11/2012 | |
| JP | 2013-175824 | A | 9/2013 | |
| JP | 2013-219686 | A | 10/2013 | |
| JP | 2014-93656 | A | 5/2014 | |
| JP | 2014-204325 | | 10/2014 | |
| JP | 2014-230176 | | 12/2014 | |
| WO | 2014/162849 | A1 | 10/2014 | |
| WO | WO 2014/162736 | A1 | 10/2014 | |

OTHER PUBLICATIONS

International Search Report dated Jul. 5, 2016 in PCT/JP2016/001831 filed Mar. 30, 2016.
Office Action dated Nov. 28, 2017 in corresponding Japanese Patent Application No. 2016-246364, 8 pages.
Office Action dated Aug. 27, 2019 in Japanese Patent Application No. 2018-128346, with English-language translation, 14 pages.
Notice of Reason for Refusal dated Apr. 7, 2020, in Japanese Patent Application No. 2018-128346 (with English-language translation).

* cited by examiner

Spectral characteristics of color separation prism of this technology

Spectral characteristics of color separation prism of typical example

TB2
(Positive signal RGB table)

|  | R | G | B |
|---|---|---|---|
| p 0 | 0 | 0 | 0 |
| p 1 | 0 | 0 | 0.01 |
| ... | ... | ... | ... |
| p 100 | 0 | 0 | 1 |
| p 101 | 0 | 0.01 | 0 |
| ... | ... | ... | ... |
| p10200 | 0 | 1 | 1 |
| p10201 | 0.01 | 0 | 0 |
| ... | ... | ... | ... |
| p1030299 | 1 | 1 | 0.99 |
| p1030300 | 1 | 1 | 1 |

TB1
(Negative signal RGB table)

|  | R | G | B |
|---|---|---|---|
| m 0 | -0.3 | -0.3 | -0.3 |
| m 1 | -0.3 | -0.3 | -0.2 |
| ... | ... | ... | ... |
| m 13 | -0.3 | -0.3 | 1 |
| m 14 | -0.3 | -0.2 | -0.3 |
| ... | ... | ... | ... |
| m 195 | -0.3 | 1 | 1 |
| m 196 | -0.2 | -0.3 | -0.3 |
| ... | ... | ... | ... |
| m 1411 | 1 | 1 | -0.2 |
| m 1412 | 1 | 1 | -0.1 |

FIG.10

TB2 (Positive signal RGB table)

|  | R | G | B |
|---|---|---|---|
| p0 | 0 | 0 | 0 |
| p1 | 0 | 0 | 0.01 |
| ... | ... | ... | ... |
| p100 | 0 | 0 | 1 |
| p101 | 0 | 0.01 | 0 |
| ... | ... | ... | ... |
| p10200 | 0 | 1 | 1 |
| p10201 | 0.01 | 0 | 0 |
| ... | ... | ... | ... |
| p1030299 | 1 | 1 | 0.99 |
| p1030300 | 1 | 1 | 1 |

↓ Convert RGB into Lab

**TB4 (Positive signal L\*a\*b\* table)**

|  | L* | a* | b* |
|---|---|---|---|
| p0 | 0 | 0 | 0 |
| p1 | 7 | 31 | -51 |
| ... | ... | ... | ... |
| p100 | 34 | 66 | -110 |
| p101 | 32 | -50 | 47 |
| ... | ... | ... | ... |
| p10200 | 91 | -69 | -16 |
| p10201 | 16 | 47 | 28 |
| ... | ... | ... | ... |
| p1030299 | 99 | -2 | 6 |
| p1030300 | 100 | 0 | 0 |

FIG.12

**TB4 (Positive signal L*a*b*table)**

| | L* | a* | b* |
|---|---|---|---|
| p 0 | 0 | 0 | 0 |
| p 1 | 7 | 31 | -51 |
| ... | ... | ... | ... |
| p 100 | 34 | 66 | -110 |
| p 101 | 32 | -50 | 47 |
| ..... | ..... | ..... | ..... |
| p10200 | 91 | -69 | -16 |
| p10201 | 16 | 47 | 28 |
| ..... | ..... | ..... | ..... |
| p1030299 | 99 | -2 | 6 |
| p1030300 | 100 | 0 | 0 |

Select combination of L*a*b*, which is closest to combination m0 of L*a*b*, out of combinations p0 to p1030300 of L*a*b*

**TB3 (Negative signal L*a*b*table)**

| | L* | a* | b* |
|---|---|---|---|
| m 0 | -270 | 0 | 0 |
| m 1 | -263 | 39 | -135 |
| ... | ... | ... | ... |
| m 13 | -176 | 504 | -472 |
| m 14 | -207 | -156 | 102 |
| ... | ... | ... | ... |
| m 195 | 88 | -103 | -21 |
| m 196 | -251 | 117 | 34 |
| ..... | ..... | ..... | ..... |
| m 1411 | 96 | -22 | 388 |
| m 1412 | 96 | -20 | 240 |

FIG.13

TB5
(Conversion L*a*b*table)

| | L* | a* | b* |
|---|---|---|---|
| m 0 | 0 | 0 | 0 |
| m 1 | 23 | -26 | -28 |
| ... | ... | ... | ... |
| m 13 | 60 | 5 | -107 |
| m 14 | 10 | 3 | -28 |
| ... | ... | ... | ... |
| m 195 | 91 | -40 | -90 |
| m 196 | 2 | 12 | 3 |
| ... | ... | ... | ... |
| m 1411 | 97 | -17 | 10 |
| m 1412 | 100 | 0 | 0 |

FIG.14

TB5 (Conversion L*a*b* table)

| | L* | a* | b* |
|---|---|---|---|
| m 0 | 0 | 0 | 0 |
| m 1 | 23 | -26 | -28 |
| ... | ... | ... | ... |
| m 13 | 60 | 5 | -107 |
| m 14 | 10 | 3 | -28 |
| ... | ... | ... | ... |
| m 195 | 91 | -40 | -90 |
| m 196 | 2 | 12 | 3 |
| ... | ... | ... | ... |
| m 1411 | 97 | -17 | 10 |
| m 1412 | 100 | 0 | 0 |

Convert Lab into RGB

TB6 (Conversion R'G'B' table)

| | R' | G' | B' |
|---|---|---|---|
| m 0 | 0 | 0 | 0 |
| m 1 | 0.22 | 0.19 | 0.28 |
| ... | ... | ... | ... |
| m 13 | 0.1 | 0.05 | 0.99 |
| m 14 | 0.3 | 0.2 | 0.21 |
| ... | ... | ... | ... |
| m 195 | 0.02 | 0.95 | 0.97 |
| m 196 | 0.4 | 0.23 | 0.21 |
| ... | ... | ... | ... |
| m 1411 | 1 | 0.9 | 0.95 |
| m 1412 | 1 | 0 | 0 |

FIG.15

TB6 (Conversion R'G'B' table)

|   | R' | G' | B' |
|---|---|---|---|
| m 0 | 0 | 0 | 0 |
| m 1 | 0.22 | 0.19 | 0.28 |
| ... | ... | ... | ... |
| m 13 | 0.1 | 0.05 | 0.99 |
| m 14 | 0.3 | 0.2 | 0.21 |
| ... | ... | ... | ... |
| m 195 | 0.02 | 0.95 | 0.97 |
| m 196 | 0.4 | 0.23 | 0.21 |
| ... | ... | ... | ... |
| m 1411 | 1 | 0.9 | 0.95 |
| m 1412 | 1 | 0 | 0 |

Obtain 3x3 matrix coefficients by method of least squares →

$$\begin{bmatrix} R' \\ G' \\ B' \end{bmatrix}_{(TB6)} = \begin{bmatrix} a & b & c \\ d & e & f \\ g & h & i \end{bmatrix}_{\text{3x3 matrix coefficients}} \begin{bmatrix} R \\ G \\ B \end{bmatrix}_{(TB1)}$$

TB1 (Negative signal RGB table)

|   | R | G | B |
|---|---|---|---|
| m 0 | -0.3 | -0.3 | -0.3 |
| m 1 | -0.3 | -0.3 | -0.2 |
| ... | ... | ... | ... |
| m 13 | -0.3 | -0.3 | 1 |
| m 14 | -0.3 | -0.2 | -0.3 |
| ... | ... | ... | ... |
| m 195 | -0.3 | 1 | 1 |
| m 196 | -0.2 | -0.3 | -0.3 |
| ... | ... | ... | ... |
| m 1411 | 1 | 1 | -0.2 |
| m 1412 | 1 | 1 | -0.1 |

FIG.16

IMAGING APPARATUS, IMAGING SYSTEM, AND IMAGING METHOD

TECHNICAL FIELD

This technology relates to an imaging apparatus, an imaging system, and an imaging method that pick up color images.

BACKGROUND ART

In recent years, demands for a high image quality of recorded/reproduced video signals of picked up images are increasing, and demands for the color reproducibility of reproducing colors in nature accurately are increasing. Specifically, in recent years, ITU-R BT. 2020, i.e., the color gamut that supports ultra high definition televisions (UHDTV) such as 4K and 8K, is defined.

According to a method disclosed in, for example, Patent Literature 1, RAW data is obtained by using an image sensor of an imaging apparatus, the RAW data is transmitted to an image processing apparatus via a medium or via communication, and image data having a desired color gamut is developed by the image processing apparatus. According to this method, the color gamut and the gamma of image data may be selected when developing images.

CITATION LIST

Patent Literature

PTL 1: Japanese Patent Application Laid-open No. 2009-033385 (paragraph 0055)

SUMMARY

Technical Problem

In view of the above-mentioned circumstances, it is desirable to improve multifunctionality of an imaging apparatus and an imaging system that obtain color images.

Solution to Problem

According to an embodiment of this technology, a signal processor includes: correction circuitry configured to correct a signal for each color input to the signal processor and to output the corrected signal for each color, first conversion circuitry configured to receive the corrected signal for each color, to perform first image processing on each corrected signal for each color, and to generate a first signal having a first color gamut for each color, second conversion circuitry configured to receive the corrected signal for each color, to perform second image processing on each corrected signal for each color, and to generate a second signal having a second color gamut for each color, wherein the signal processor outputs a first image data having a first color gamut and a second image data having a second color gamut from same corrected signals for each color.

According to an embodiment of this technology, a signal processing method implemented by a signal processor, includes the steps of correcting, using correction circuitry, a signal for each color input to the signal processor and to output the corrected signal for each color, performing, using first conversion circuitry, first image processing on each corrected signal for each color, generating, using the first conversion circuitry, a first signal having a first color gamut for each color, performing, using second conversion circuitry, second image processing on each corrected signal for each color, generating, using the second conversion circuitry, a second signal having a second color gamut for each color, wherein the signal processor outputs a first image data having a first color gamut and a second image data having a second color gamut from the same corrected signals for each color.

According to an embodiment of this technology, a signal processor includes: input circuitry configured to receive light through a prism and generate a corresponding input signal, a first processing path configured to output a first image data having a first color gamut based on the input signal, and a second processing path configured to output a second image data having a second color gamut based on the input signal, wherein the first color gamut of the first image data is ITU-R BT. 2020, and wherein the second color gamut of the second image data is ITU-R BT. 709.

Advantageous Effects of Invention

As described above, according to this technology, it is possible to improve multifunctionality of an imaging apparatus and an imaging system that obtain color images.

BRIEF DESCRIPTION OF DRAWINGS

FIG. 10 is a diagram illustrating the negative signal RGB table and the positive signal L*a*b* table.

FIG. 12 is a diagram illustrating how to generate the positive signal L*a*b* table.

FIG. 13 is a diagram illustrating how to select the closest combination of L*a*b*.

FIG. 14 is a diagram illustrating the conversion L*a*b* table.

FIG. 15 is a diagram illustrating the conversion R'G'B' table.

FIG. 16 is a diagram illustrating how to calculate the 3×3 matrix coefficients.

DESCRIPTION OF EMBODIMENTS

Hereinafter, an embodiment of this technology will be described with reference to the drawings.

First Embodiment

Figure 1:
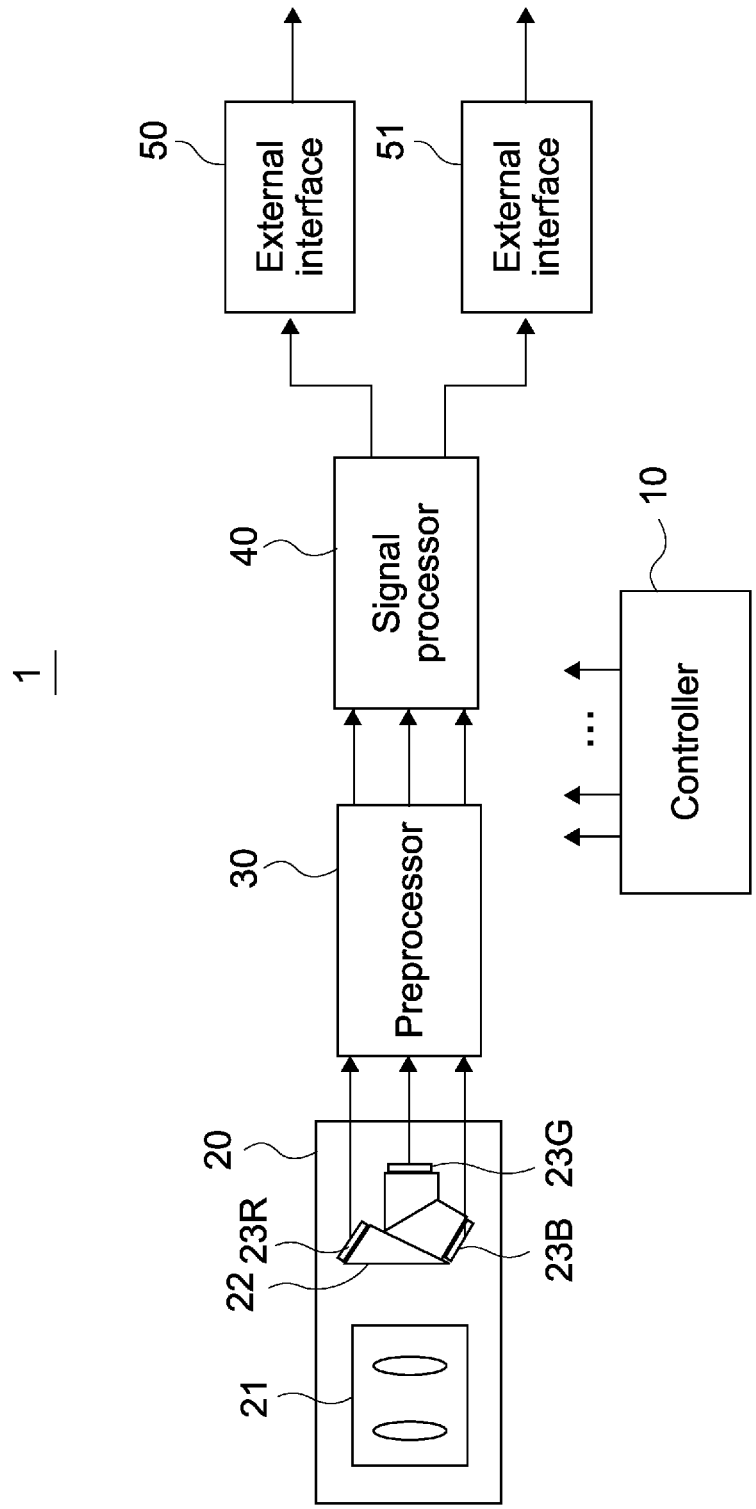
FIG. 1 is a block diagram showing the configuration of an imaging apparatus according to a first embodiment of this technology.

FIG. 1 is a block diagram showing the configuration of an imaging apparatus according to a first embodiment of this technology.

The imaging apparatus 1 includes the controller 10, the three-chip imaging unit 20, the preprocessor 30, the signal processor 40, and the external interfaces 50 and 51.

The three-chip imaging unit 20 includes the optical block 21, the color separation prism 22, and the image sensors 23R, 23G, and 23B corresponding to RGB colors. The three-chip imaging unit 20 is configured to separate, by using the color separation prism 22, light entered via the optical block 21 into lights of RGB-color components. The three-chip imaging unit 20 is further configured to convert the lights of RGB-color components, by the corresponding image sensors 23R, 23G, and 23B, into electric signals corresponding to the intensities of the lights, and to output the electric signals.

The optical block 21 includes an image pickup lens, a focus mechanism, a shutter mechanism, a diaphragm (iris) mechanism, and the like. Various types of image sensors such as CCD (Charge Coupled Device) image sensors and CMOS (Complementary Metal Oxide Semiconductor Image Sensor) image sensors are applicable to the image sensors 23R, 23G, and 23B. The image sensors 23R, 23G, and 23B are capable of obtaining 4K×2K signals (4K images) such as 4096 horizontal pixels×2160 vertical pixels for each frame.

The color separation prism 22 is a wide color gamut prism that supports 4K images. For ultra high definition televisions (UHDTV: Ultra High Definition Televisions) such as 4K and 8K, ITU-R BT. 2020 is the standard of the color gamut of 4K and 8K images.

Figure 2A:
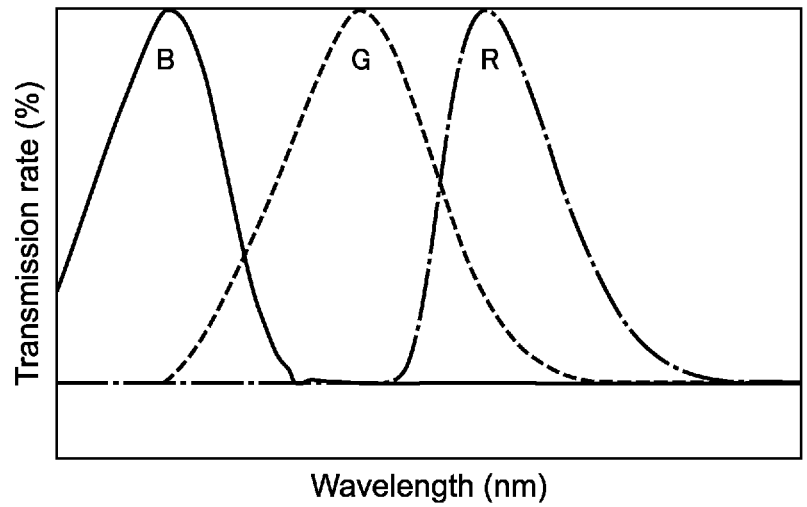
FIG. 2A is a graph showing the spectral characteristics of a color separation prism having a wide color gamut, which is used in the imaging apparatus 1 of this embodiment.
Figure 2B:
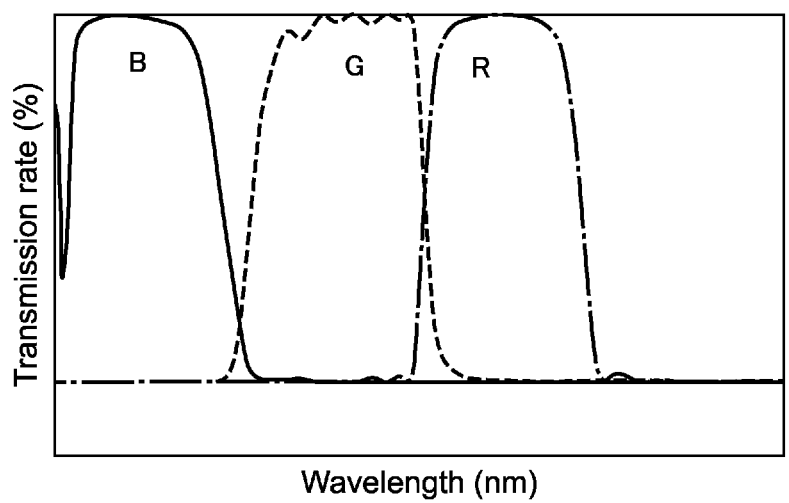
FIG. 2B is a graph showing the spectral characteristics of a typical color separation prism.
Figure 2C:
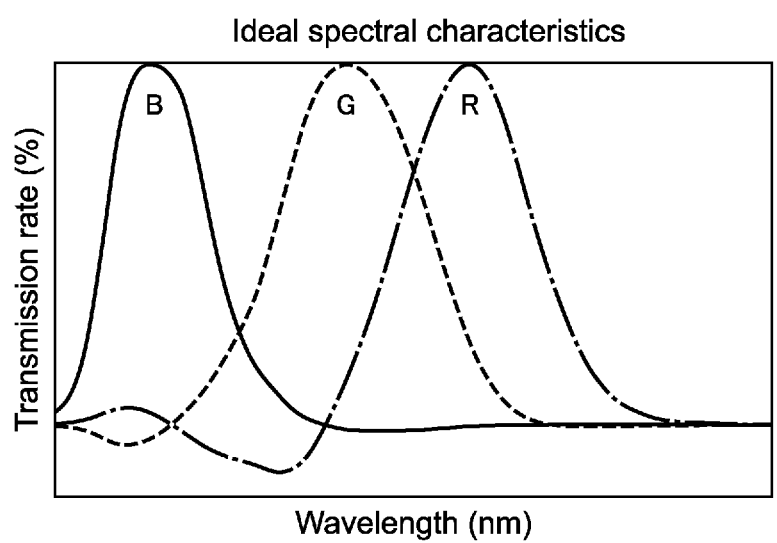
FIG. 2C is a graph showing the ideal spectral characteristics.

FIG. 2A is a graph showing the spectral characteristics of a color separation prism having a wide color gamut, which is used in the imaging apparatus 1 of this embodiment. FIG. 2B is a graph showing the spectral characteristics of a comparative typical color separation prism. FIG. 2C is a graph showing the ideal spectral characteristics. In each graph, the vertical axis shows a transmission rate, and the horizontal axis shows a wavelength. The spectral characteristics of the color separation prism 22, which is used in the imaging apparatus 1 of this embodiment and has a wide color gamut, is closer to the ideal spectral characteristics of FIG. 2C than the spectral characteristics of the typical color separation prism of FIG. 2B is. The ideal spectral characteristics of FIG. 2C are similar to the color-matching function. Since the color separation prism 22 having such a wide color gamut is employed, more colors in nature may be expressed.

The preprocessor 30 performs predetermined signal processing such as noise removal, automatic gain control, and A/D conversion for an analog image signal of each pixel supplied from the three-chip imaging unit 20, and outputs the preprocessed signal as digital image data.

The signal processor 40 processes the digital image data output from the preprocessor 30 such as filtering processing and generation of two-system image data having different types of color gamut.

Figure 3:
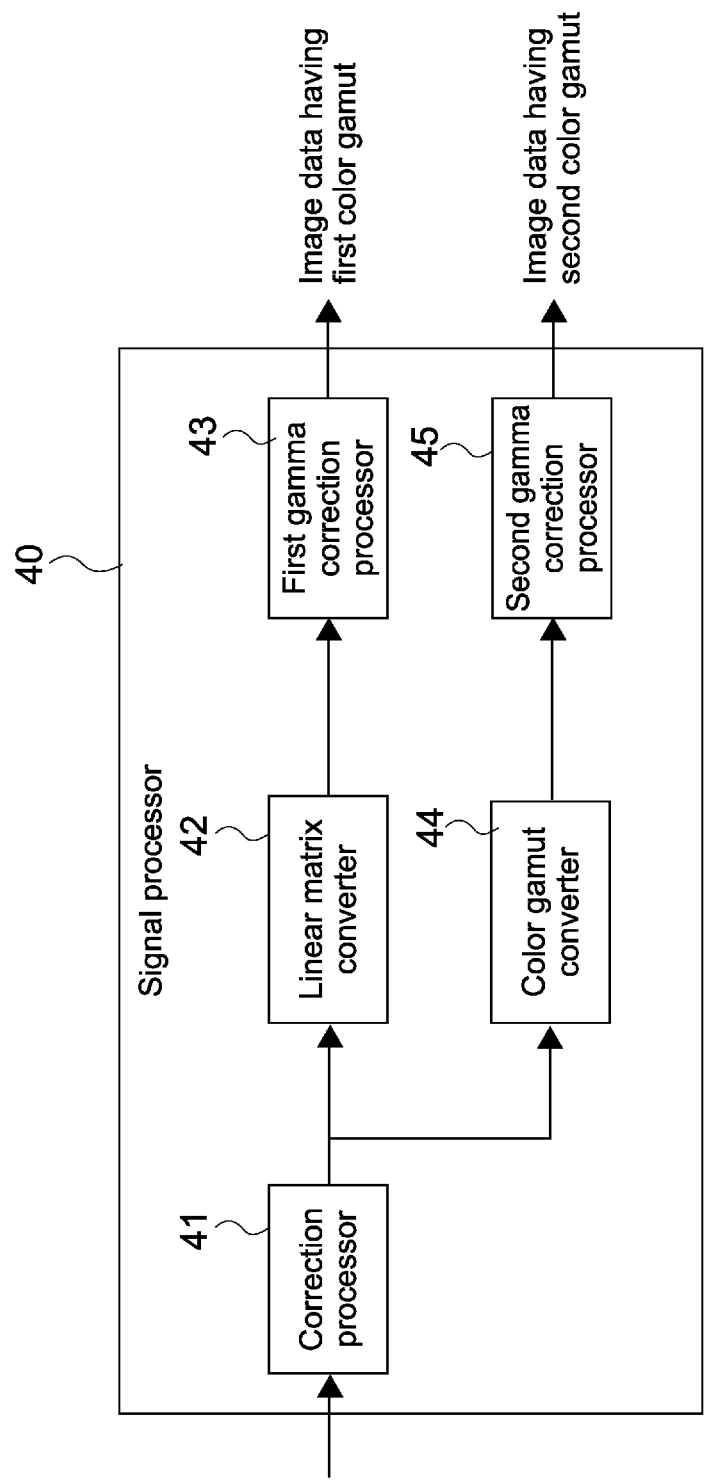
FIG. 3 is a diagram showing the configuration of the signal processor 40 of the imaging apparatus 1 of FIG. 1.

FIG. 3 is a diagram showing the configuration of the signal processor 40.

The signal processor 40 includes, for example, an LSI (Large Scale Integrated Circuit) and the like.

The signal processor 40 includes the correction processor 41, the linear matrix converter 42 (first converter), the first gamma correction processor 43, the color gamut converter 44 (second converter), the second gamma correction processor 45, and the like.

The correction processor 41 corrects signals of each color output from the preprocessor 30 such as removing noise components (offset components) and white balance correction.

The linear matrix converter 42 performs, for example, 3-input/3-output matrix operation or the like on the R signal, G signal, and B signal output from the correction processor 41, and generates an R signal, a G signal, and a B signal of the first color gamut. In the imaging apparatus 1, the first color gamut is the color gamut determined based on ITU-R (International Telecommunication Union Radio communication sector). 2020. The matrix coefficients of the linear matrix converter 42 are determined such that the target color gamut of the matrix-operated R signal, G signal, and B signal is the same as the color gamut determined based on ITU-R BT. 2020.

The first gamma correction processor 43 performs gamma correction on the R signal, G signal, and B signal output from the linear matrix converter 42. In this case, in order to realize the linear characteristics finally, reverse correction is performed on the non-linear characteristics of a display apparatus such as a liquid crystal display.

The color gamut converter 44 converts the R signal, G signal, and B signal output from the correction processor 41 into an R signal, a G signal, and a B signal of the second color gamut, which is narrower than the first color gamut, such as the color gamut determined based on for example ITU-R BT. 709.

Figure 4:
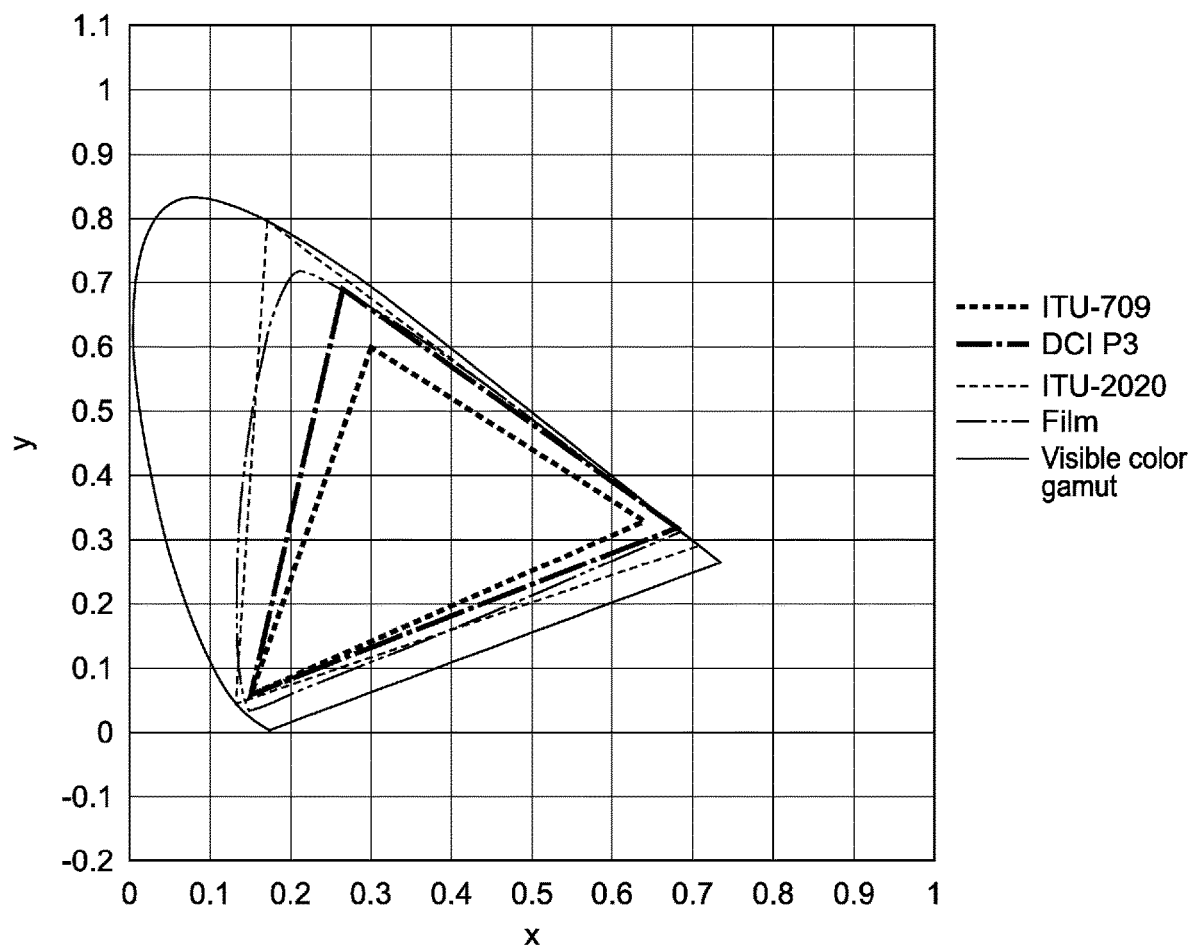
FIG. 4 is a comparative diagram showing the color gamut of ITU-R BT. 709, the color gamut of ITU-R BT. 2020, the color gamut of DCI P3, and the color gamut for films.

FIG. 4 is a comparative diagram showing the color gamut of ITU-R BT. 709, the color gamut of ITU-R BT. 2020, the color gamut of DCI P3, and the color gamut for films. DCI P3 (Digital Cinema Initiatives) shows the color gamut for images projected by using a cinema projector.

With regard to those types of color gamut, the color gamut determined based on ITU-R BT. 2020 is a color gamut containing all the color gamut of ITU-R BT. 709, the color gamut of DCI P3, and the color gamut for film. In other words, the color gamut determined based on ITU-R BT. 2020 is a color gamut capable of expressing more colors in nature than the color gamut of ITU-R BT. 709, the color gamut of DCI P3, and the color gamut for films.

The second gamma correction processor 45 performs gamma correction on the R signal, G signal, and B signal output from the color gamut converter 44. In this case, similar to the first gamma correction processor 43, in order to realize the linear characteristics finally, reverse correction is performed on the non-linear characteristics of a display apparatus such as a liquid crystal display.

With reference to FIG. 1 again, the first external interface 50 sends image data having the first color gamut output from the signal processor 40 to an apparatus that uses the image data having the first color gamut. The second external interface 51 sends image data having the second color gamut output from the signal processor 40 to an apparatus that uses the image data having the second color gamut. Each of the first external interface 50 and the second external interface 51 is, for example, a 3G-SDI (3G Serial Digital Interface), an HD-SDI (High Definition Serial Digital Interface), or the like. The first external interface 50 and the second external interface 51 are capable of outputting the image data of the first color gamut and the image data of the second color gamut simultaneously.

Note that an encoder may compress and encode the image data of the two types of color gamut output from the signal processor 40 based on, for example, the MPEG4-AVC standard. The compressed and encoded image data may be transmitted from the first external interface 50 and the second external interface 51.

Further, the compressed and encoded image data may be recorded in a recording medium (not shown) of the imaging apparatus 1 such as a memory card, for example.

Further, the image data of at least one type of color gamut generated by the signal processor 40 may be down converted such as decimating, and the down converted image data may be displayed on a monitor for a finder (not shown) of the imaging apparatus 1.

The controller 10 is a microcomputer including a CPU (Central Processing Unit), a RAM (Random Access Memory), a flash ROM (Read Only Memory), a clock circuit, and the like connected via a system bus. The controller 10 controls behaviors of the respective units of the imaging apparatus 1. The RAM is mainly used as a work area, and temporarily stores results in progress of processing and the like. The flash ROM stores various programs executed by the CPU, data necessary for processing, and the like.

(Behavior of the Imaging Apparatus 1)

In the imaging apparatus 1 of this embodiment, first, the three-chip imaging unit 20, which includes the color separation prism 22 having the wide color gamut supporting 4K images, obtains an RGB-color signal. The preprocessor 30 removes noises from the RGB-color signal, amplifies the RGB-color signal, then A/D converts the RGB-color signal, and supplies the resultant digital image data to the signal processor 40.

In the signal processor 40, first, the correction processor 41 removes noise components (offset components) from an RGB-color signal, corrects the white balance, and the like. The RGB-color signal corrected by the correction processor 41 is supplied to the 3-input/3-output linear matrix converter 42 and the color gamut converter 44. The 3-input/3-output linear matrix converter 42 is set such that the target color gamut of the matrix-operated R signal, G signal, and B signal is the first color gamut.

The 3-input/3-output linear matrix converter 42, which is set such that the target color gamut of the matrix-operated R signal, G signal, and B signal is the first color gamut, converts the RGB signal from the correction processor 41 to an RGB signal having the first color gamut.

The image data having the first color gamut generated by the linear matrix converter 42 is supplied to the first gamma correction processor 43.

Meanwhile, in parallel with generating the image data having the first color gamut by the linear matrix converter 42, the color gamut converter 44 converts the color gamut of the RGB signal supplied from the correction processor 41 into the second color gamut, which is narrower than the first color gamut, such as a color gamut determined based on ITU-R BT. 709, for example. In this example, it is assumed that the color gamut is converted with reference to a 3DLUT (3D lookup table).

The first gamma correction processor 43 performs gamma correction of the RGB signal having the first color gamut supplied from the linear matrix converter 42. The first external interface 50 transmits the gamma-corrected image data having the first color gamut to an external video apparatus such as a liquid crystal display that supports the first color gamut and a switcher that switches the output destination of the input image data to be supplied to the liquid crystal display.

Meanwhile, the second gamma correction processor 45 performs gamma correction of the RGB signal having the second color gamut supplied from the color gamut converter 44.

The second external interface 51 transmits the gamma-corrected image data having the second color gamut to an external video apparatus such as a liquid crystal display that supports the second color gamut and a switcher that switches the output destination of the input image data to be supplied to the liquid crystal display.

As described above, according to this embodiment, the imaging apparatus 1 is capable of obtaining image data having two kinds of color gamut simultaneously. Specifically, since the three-chip imaging unit 20, which includes the color separation prism 22 having the wide color gamut supporting 4K images is used, it is possible to obtain image data having two kinds of color gamut, one of which is image data having the first color gamut determined based on ITU-R BT. 2020. Further, it is possible to obtain the image data having the first color gamut and image data having the second color gamut, i.e., image data having the color gamut determined based on ITU-R BT. 709, simultaneously. As a result, under an environment in which there is no liquid crystal display that supports 4K images, for example, images can be displayed on a liquid crystal display that supports HD (high definition) images. So the imaging apparatus 1 may have broader utility.

Next, the color gamut converter 44 of the signal processor 40 will be described additionally.

Figure 5:
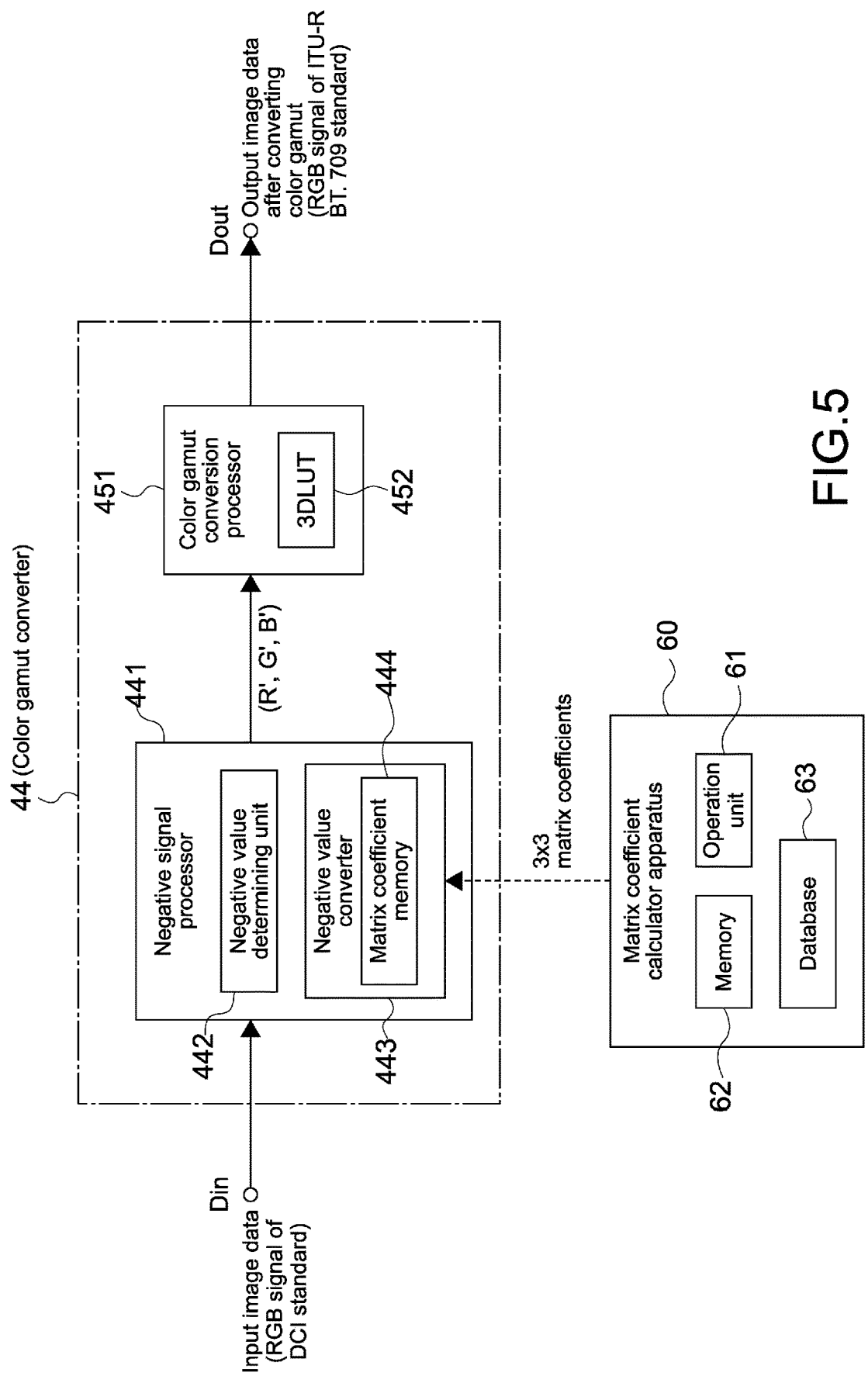
FIG. 5 is a block diagram showing the configuration of the color gamut converter 44 and the matrix coefficient calculator apparatus 60.

FIG. 5 is a block diagram showing the configuration of the color gamut converter 44.

The color gamut converter 44 compresses input image data Din having a color gamut obtained by the three-chip imaging unit 20, which includes the color separation prism 22 having the wide color gamut supporting 4K images, and thereby obtains image data having the second color gamut such as a color gamut determined based on ITU-R BT. 709 standard or the like, for example.

The color gamut converter 44 includes the negative signal processor 441 and the color gamut conversion processor 451.

The input image data Din is input in the negative signal processor 441. The negative signal processor 441 includes the negative value determining unit 442 and the negative value converter 443.

The negative value determining unit 442 determines if at least one of the R value, G value, and B value, i.e., image signal values, of the input RGB signal is negative or not.

The negative value converter 443 performs conversion process through an operation using 3×3 matrix coefficients stored in the matrix coefficient memory 444. If at least one of the input R value, G value, and B value is negative, the negative value converter 443 converts the R value, G value, and B value into R' value, G' value, and B' value through an operation using the 3×3 matrix coefficients.

In other words, the following (Math. 1) shows the operation process performed by the negative value converter 443.

$$\begin{bmatrix} R' \\ G' \\ B' \end{bmatrix} = \begin{bmatrix} a & b & c \\ d & e & f \\ g & h & i \end{bmatrix} \begin{bmatrix} R \\ G \\ B \end{bmatrix} \quad \text{[Math. 1]}$$

Note that the matrix coefficient memory 444 stores the matrix coefficients, i.e., a, b, c, d, e, f, g, h, and i.

The external matrix coefficient calculator apparatus 60 previously calculates the 3×3 matrix coefficients, and the matrix coefficient memory 444 of the color gamut converter 44 of this example stores the 3×3 matrix coefficients. The configuration of the matrix coefficient calculator apparatus and how to calculate the matrix coefficients will be described later.

If at least one of the input R value, G value, and B value of the input RGB signal is negative, as described above, the negative signal processor 441 converts the input R value, G value, and B value into R' value, G' value, and B' value by using the above (Math. 1), and outputs the R' value, G' value, and B' value to the color gamut conversion processor 451. Further, if all the R value, G value, and B value of the input RGB signal are 0 or positive, the negative signal processor 441 outputs the R value, G value, and B value as they are to the color gamut conversion processor 451 as R' value, G' value, and B' value.

Figure 6:
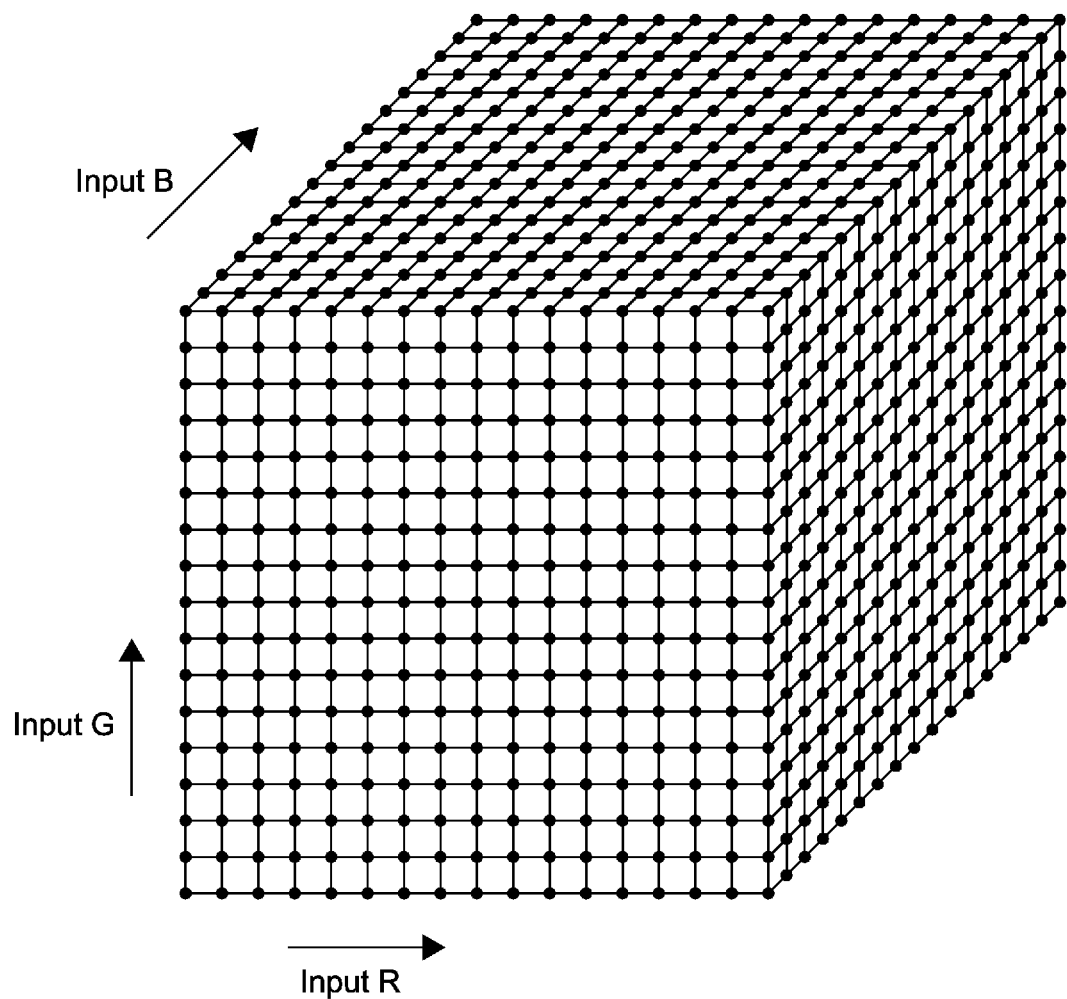
FIG. 6 is a diagram illustrating the 3DLUT.

The color gamut conversion processor 451 has the 3DLUT 452, and converts the color gamut of the supplied R' value, G' value, and B' value by using the 3DLUT. For example, as shown in FIG. 6, the color gamut conversion processor 451 has the 3DLUT 452, i.e., a 17×17×17 conversion table having 17 grid points (coefficient points) on each of the R axis, G axis, and B axis. This table contains 17×17×17=4913 dotted grid points. Output R, G, and B values or coefficient values, which are used to obtain output R, G, and B values, are stored in each grid point.

The color gamut conversion processor 451 refers to a certain grid point of the 3DLUT 452 for the input R' value, G' value, and B' value, thereby obtains color-gamut-converted output RGB values, and outputs the color-gamut-converted output RGB values as output image data after converting color gamut Dout. In the 3DLUT 452, the 17 grid points correspond to the range between 0.0 and 1.0, for example, as each of the input R value, G value, and B value. In other words, the conversion table only supports 0 and positive values to be input.

Figure 7:
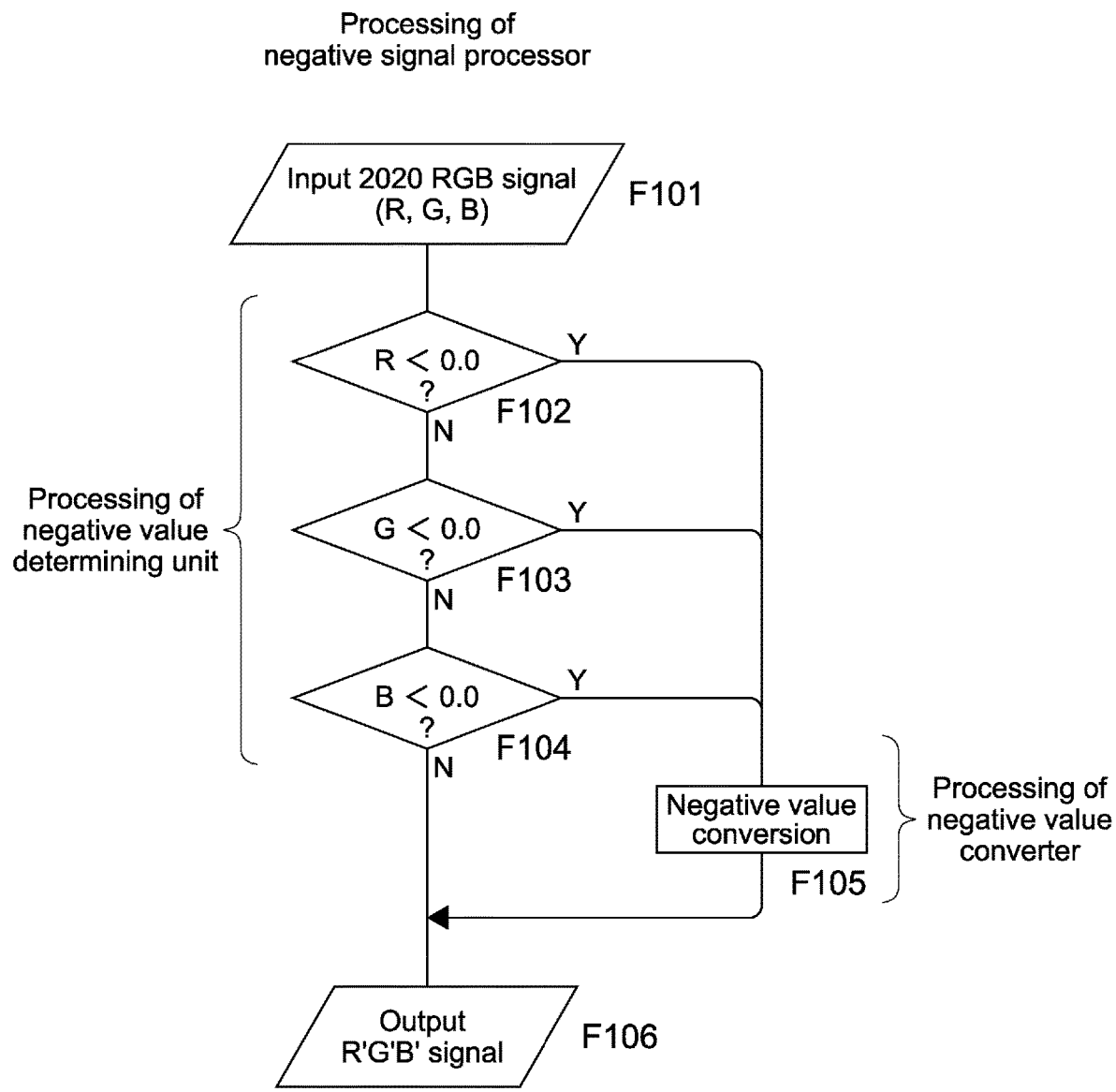
FIG. 7 is a flowchart showing the processing of the negative signal processor 441 of the color gamut converter 44.

FIG. 7 shows the processing of the negative signal processor 441 of the color gamut converter 44.

In Step F101, an RGB signal is input as the input image data Din. Then, firstly, the negative value determining unit 442 of the negative signal processor 441 judges the input R value, G value, and B value in Steps F102, F103, and F104, respectively. In other words, the negative value determining unit 442 determines if each of R value, G value, and B value is negative or not.

Then, if at least one of the R value, G value, and B value is negative, the negative signal processor 441 proceeds to Step F105, and performs negative value conversion. In other words, in this case, the negative value converter 443 performs the operation of the above (Math. 1) using the 3×3 matrix coefficients. As a result, all the R value, G value, and B value are converted into non-negative values. Then, in Step F106, the negative signal processor 441 outputs the non-negative R' value, G' value, and B' value obtained as the result of conversion to the color gamut conversion processor 451.

Alternatively, if all the R value, G value, and B value input in Step F101 are 0 or positive and there is no negative value, after the process of Steps F102, F103, and F104, the process proceeds to Step F106. In this case, the input R value, G value, and B value are output to the color gamut conversion processor 451 as they are as R' value, G' value, and B' value.

Since the negative value converter 443 processes the RGB signal input as the input image data Din as described above, no negative values are supplied to the color gamut conversion processor 451 as RGB signal values.

So, a negative value is not clipped and not converted into 0 by using the 3DLUT 452 which does not support negative values as input values, i.e., the 3DLUT having the grid points that support 0.0 to 1.0, for example. As a result, in color gamut conversion, the hue is not changed due to clipping, and the gradation is not degraded. Specifically, by converting negative signal values into 0 or positive signal values by using the appropriate 3×3 matrix coefficients, the gradation may not be changed and displayed colors may be more accurate.

Further, since the 3DLUT 452 does not need to support negative values to be input, it is not necessary to add, to the 3DLUT 452, grid points that support negative values to be input. In other words, it is not necessary to increase the size of the 3DLUT 452. Further, the accuracy of the 3DLUT 452 is not decreased because it is not necessary to assign negative values to some grid points.

By the way, if at least one of RGB signal values is negative, the negative signal processor 441 converts the RGB signal by using the 3×3 matrix coefficients in order that no signal value is negative. In this case, the 3×3 matrix coefficients should be determined appropriately in order that the converted RGB signal has the hue and gradation the same as those before conversion.

Such 3×3 matrix coefficients are preset and stored in the matrix coefficient memory 444.

FIG. 5 shows the matrix coefficient calculator apparatus 60 that calculates 3×3 matrix coefficients to be stored in the matrix coefficient memory 444 of the color gamut converter 44. The matrix coefficient calculator apparatus 60 is realized by an apparatus having the functions of the operation unit 61, the memory 62, and the database 63.

The operation unit 61 performs various kinds of operation process (described later) to calculate matrix coefficients such as conversion process from an RGB signal to an L*a*b*signal, ΔE* operation, ΔE*94 operation, a table-creation operation, and the like.

The memory 62 includes memory areas such as, for example, a ROM, a RAM, and a nonvolatile memory. The ROM area stores a program, processing coefficients, and the like for the operation process performed by the operation unit 61. The program is a program used to calculate matrix coefficients (described later). The RAM area of the memory 62 is used as a work area for the operation process and a storage area that stores table data (described later).

The database 63 stores coefficients used to convert an RGB signal into an L*a*b*signal, and stores other data.

How the matrix coefficient calculator apparatus 60 calculates 3×3 matrix coefficients will be described hereinafter.

First, before describing how to calculate 3×3 matrix coefficients, what kind of conversion process is performed by using 3×3 matrix coefficients, i.e., how the negative value converter 443 performs conversion process, will be described with reference to FIG. 8.

Figure 8:
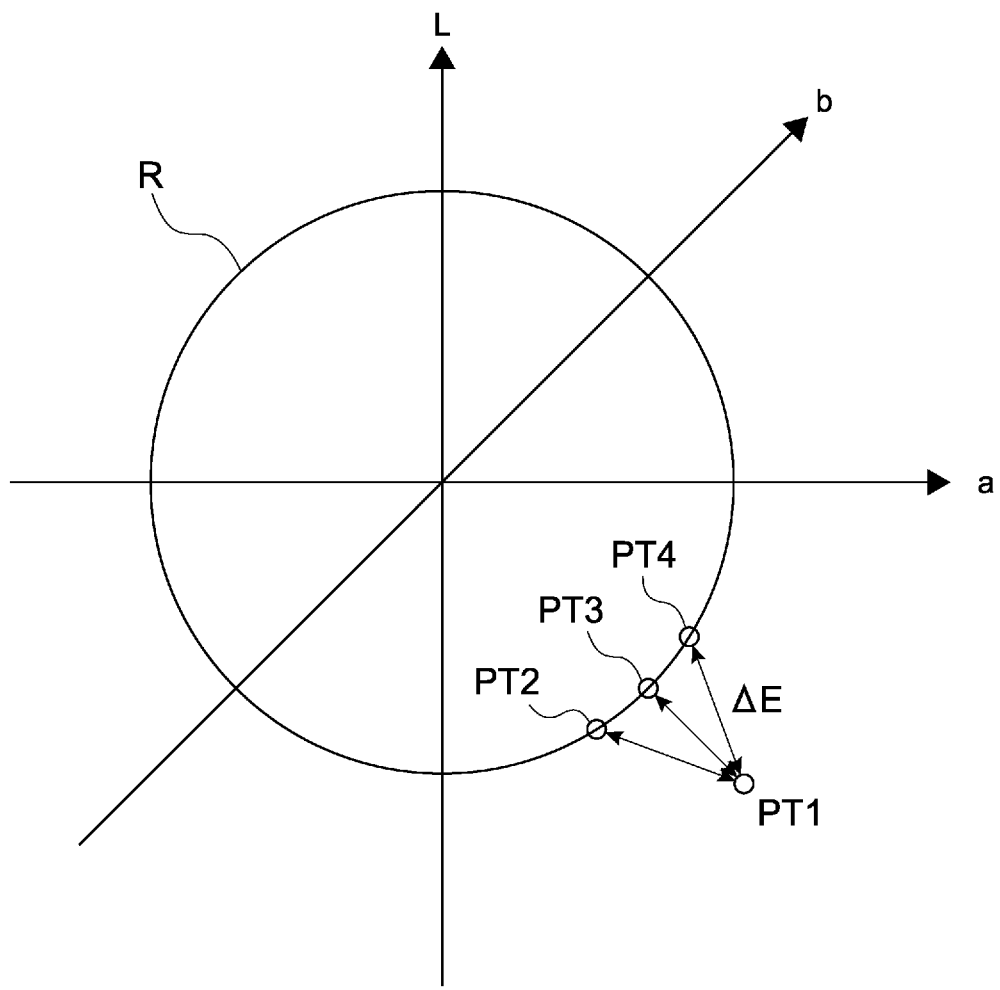
FIG. 8 is a diagram conceptually illustrating how a negative signal is converted.

FIG. 8 shows a 3D space having the L* axis, the a* axis, and the b* axis as the L*a*b*color-system space. In the 3D space, the sphere R shows the zone in which all of the R value, G value, and B value of the RGB signal are 0 or more (0 or positive). In other words, if at least one of the R value, G value, and B value of the RGB signal is negative, then the RGB signal is at a point outside of the sphere R of the L*a*b*color-system space.

For example, the point PT1 is a point showing the RGB signal values, at least one of R value, G value, and B value being negative, in the L*a*b*color-system space.

Note that the L*a*b*color system is defined by CIE (Commission Internationale de l'Eclairage: International Commission on Illumination) and is a color system independent of devices, where L* represents luminosity, and the combinations of a* and b* represent all the hues. Further, a* value represents chroma from red to green, b* value represents chroma from yellow to blue.

In this example, according to the conversion process performed by the negative value converter 443 of the color gamut converter 44, for example, the RGB signal at the point PT1 in the L*a*b*color system is converted into an RGB signal in the sphere R (or on the surface of the sphere R).

Here, the RGB signal values at the point PT1 may be converted into RGB signal values at any various points, an infinite number of points being on/in the sphere R. In view of this, the following is one method of minimizing the change of hue and the decrease of gradation. According to this method, by using a color-difference formula represented by ΔE* or ΔE*94 (described later), the RGB signal values at the point PT1 may be converted into RGB signal values at the point at which the change of hue and the decrease of gradation are minimum, i.e., the point at which the color difference is minimum.

For example, as shown in FIG. 8, let's say that the point PT1 is to be converted into any one of candidate points PT2, PT3, and PT4 on/in the sphere R each having certain color. Each of those points PT2, PT3, and PT4 has 0 or positive R value, G value, and B value.

In this case, ΔE* between each candidate point and the point PT1 is calculated, and the point PT1 is converted into the candidate point having the smallest ΔE*. For example, if ΔE* between the points PT1 and PT2 is the smallest, the point PT1 is converted into the point PT2.

Further, the below-described 3×3 matrix coefficients are coefficients used to obtain a point having the smallest ΔE, into which the point is to be converted, for example.

Figure 9:
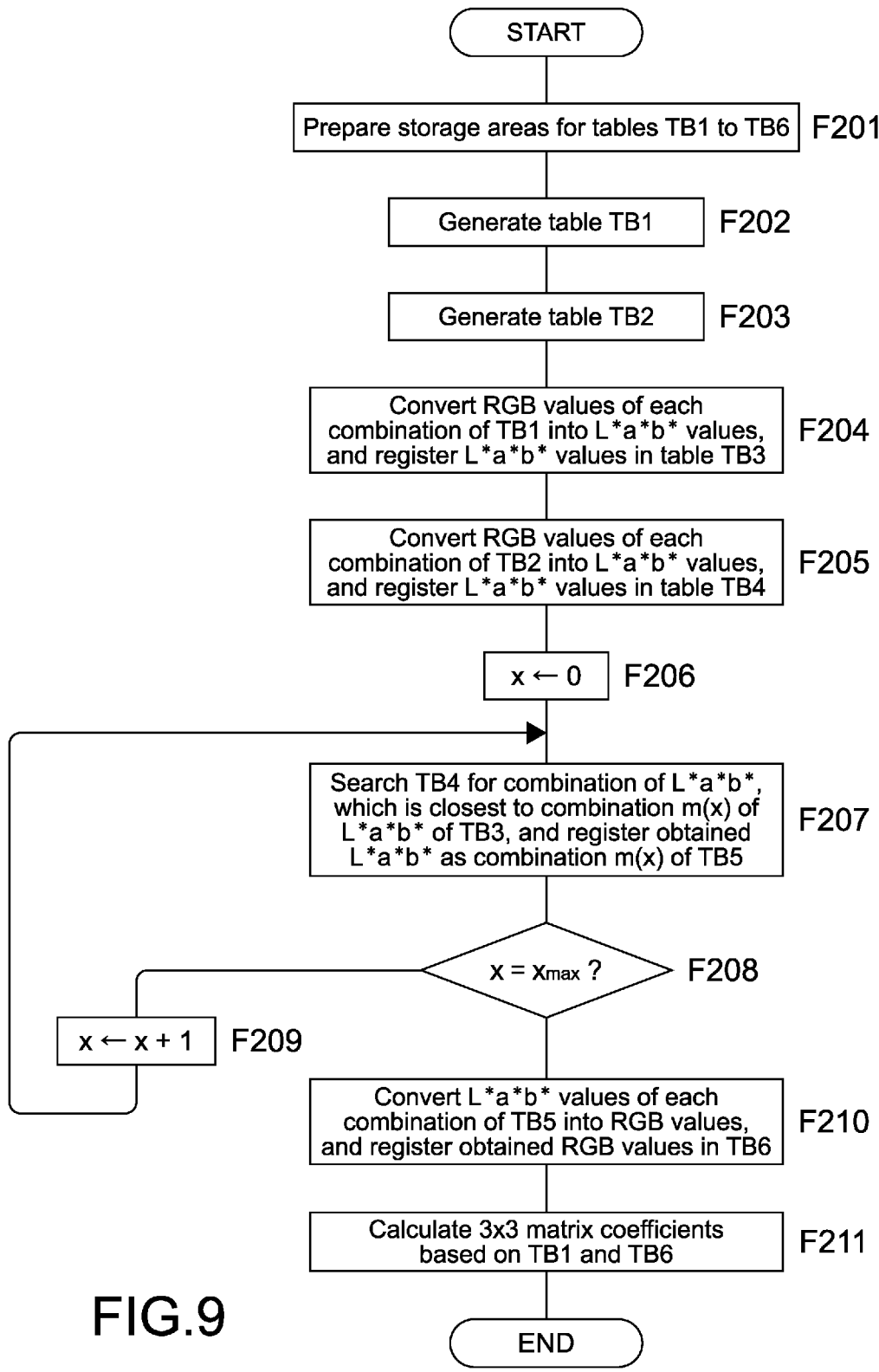
FIG. 9 is a flowchart showing the processing of 3×3 matrix coefficients calculation.

FIG. 9 shows how the matrix coefficient calculator apparatus 60 calculate such 3×3 matrix coefficients. FIG. 9 shows the process performed by the operation unit 61 of the matrix coefficient calculator apparatus 60 by using the memory 62 and the database 63.

First, in Step F201, the operation unit 61 prepares storage areas for tables TB1 to TB6 in the memory 62.

As described below, the tables TB1 to TB6 are a negative signal RGB table TB1, a positive signal RGB table TB2, a negative signal L*a*b* table TB3, a positive signal L*a*b* table TB4, a conversion L*a*b* table TB5, and a conversion R'G'B' table TB6.

In Step F202, the operation unit 61 generates the negative signal RGB table TB1. Further, in Step F203, the operation unit 61 generates the positive signal RGB table TB2.

FIG. 10 shows an example of the negative signal RGB table TB1 and an example of the positive signal RGB table TB2.

First, values of 14 levels including negative values are prepared for each of R value, G value, and B value. For example, "−0.3", "−0.2", "−0.1", "0.0", "0.1", "0.2", . . . "0.9", and "1.0" are prepared.

As described above, for example, if the values of 14 levels with 0.1 increments are prepared, the total number of the combinations of R value, G value, and B value is 2744, i.e., the cube of 14.

The number of the combinations of 0 or positive R value, 0 or positive G value, and 0 or positive B value, i.e., the combinations of the values of 11 levels ("0.0", "0.1", . . . "0.9", and "1.0") is 1331, i.e., the cube of 11, out of the 2744 combinations.

Then, the number of the combinations of R value, G value, and B value, at least one of which is negative, is 2744−1331=1413 (combinations).

In Step F202, the 1413 combinations of R value, G value, and B value are registered in the negative signal RGB table TB1.

FIG. 10 shows the 1413 combinations having the combination numbers m0 . . . m1412. At least one of R value, G value, and B value of each registered combination is negative. For example the combination m0 has "−0.3", "−0.3", and "−0.3" as the R value, G value, and B value. The combination m1 has "−0.3", "−0.3", and "−0.2" as the R value, G value, and B value. The combination m1412 has "1", "1", and "−0.1" as the R value, G value, and B value.

Further, in Step F203, the combinations of R value, G value, and B value, all of which are 0 or positive signal values, are registered in the generated positive signal RGB table TB2.

As shown in FIG. 10, for example, all the combinations of the values of 101 levels with 0.01 increments from "0" to "1.0" are registered in the positive signal RGB table TB2.

For example, the total number of all the combinations is 1030301, i.e., the cube of 101. FIG. 10 shows the 1030301 combinations having the combination numbers p0 . . . p1030300.

For example the combination p0 has "0", "0", and "0" as the R value, G value, and B value. The combination p1 has "0", "0", and "0.01" as the R value, G value, and B value. The combination p1030300 has "1", "1", and "1" as the R value, G value, and B value.

Next, in Step F204, the operation unit 61 converts the RGB values of each combination of the negative signal RGB table TB1 into L*a*b* values, and registers the L*a*b* values in the negative signal L*a*b* table TB3.

Figure 11:
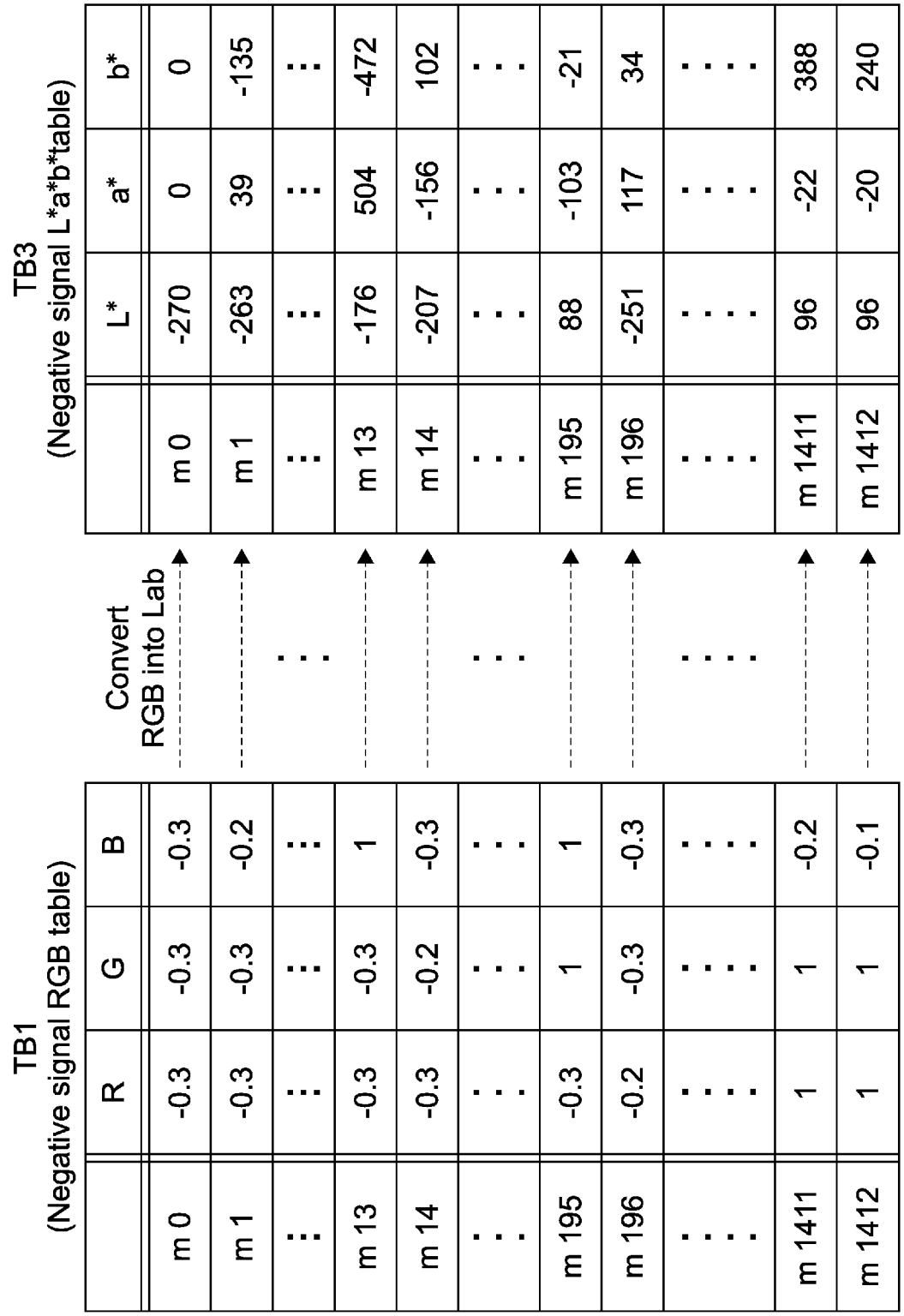
FIG. 11 is a diagram illustrating how to generate the negative signal L*a*b* table.

FIG. 11 shows such a method. The values of each combination m0 to m1412 of the negative signal RGB table TB1 are converted into L*value, a* value, and b* value, and they are registered in the negative signal L*a*b* table TB3.

For example, "−0.3", "−0.3", and "−0.3" of the R value, G value, and B value of the combination m0 are converted into L*a*b* values, and the thus obtained "−270", "0", and "0" are registered as the L* value, a* value, and b* value of the combination m0 of the negative signal L*a*b* table TB3. The same applies to the combinations m1 and thereafter. R value, G value, and B value are converted into L* value, a* value, and b* value, and they are registered as the combinations m1 and thereafter of the negative signal L*a*b* table TB3.

Note that L* value, a* value, and b* value are obtained based on R, G, and B values by using the following (Math. 2).

$$\begin{bmatrix} X \\ Y \\ Z \end{bmatrix} = \begin{bmatrix} a' & b' & c' \\ d' & e' & f' \\ g' & h' & i' \end{bmatrix} \begin{bmatrix} R \\ G \\ B \end{bmatrix}$$ [Math. 2]

-continued $$L^* = 116(Y/Yn)^{1/3} - 16$$

$$a^* = 500\{(X/Xn)^{1/3} - (Y/Yn)^{1/3}\}$$

$$b^* = 200\{(Y/Yn)^{1/3} - (Z/Zn)^{1/3}\}$$

Here, Xn, Yn, and Zn are tristimulus values of a light source, and (Xn, Yn, Zn)=(95.04, 100.00, 108.89) is satisfied for the standard illuminant D65, for example.

Next, in Step F205, similar to Step F204 above, the operation unit 61 converts the RGB values of each combination of the positive signal RGB table TB2 into L*a*b* values, and registers the L*a*b* values in the positive signal L*a*b* table TB4.

FIG. 12 shows such a method. The values of each combination p0 to p1030300 of the positive signal RGB table TB2 are converted into L*value, a* value, and b* value, and they are registered in the positive signal L*a*b* table TB4.

For example, "0", "0", and "0" of the R value, G value, and B value of the combination p0 are converted into L*a*b* values, and the thus obtained ("0", "0", and "0") are registered as the L* value, a* value, and b* value of the combination p0 of the positive signal L*a*b* table TB4.

Further, "0", "0", and "0.01" of the R value, G value, and B value of the combination p1 are converted into L*a*b* values, and the thus obtained ("7", "31", and "−51") are registered as the L* value, a* value, and b* value of the combination p1 of the positive signal L*a*b* table TB4. The same applies to the combinations p2 and thereafter.

As described above, after the negative signal L*a*b* table TB3 and the positive signal L*a*b* table TB4 are generated, next, the operation unit 61 generates the conversion L*a*b* table TB5 in the process of Steps F206, F207, F208, and F209.

In other words, in Step F206, the operation unit 61 prepares the variable x=0. In Step F207, the operation unit 61 searches the positive signal L*a*b* table TB4 for the combination of L* value, a* value, and b* value, which is the closest to the combination m(x) of L* value, a* value, and b* value of the negative signal L*a*b* table TB3. The operation unit 61 registers the combination of L* value, a* value, and b* value, which is obtained as the result of the search, as the combination m(x) of L* value, a* value, and b* value of the conversion L*a*b* table TB5.

So, when x=0 is satisfied at first, as shown in FIG. 13, the combination of L*a*b* values, which is the closest to the combination m0 of L*a*b* values of the negative signal L*a*b* table TB3, is selected out of the combination p0 to the combination p1030300 of the positive signal L*a*b* table TB4.

The combinations of L*a*b* values registered in the negative signal L*a*b* table TB3 are L*a*b* values outside of the sphere R of FIG. 8. The combinations of L*a*b* values registered in the positive signal L*a*b* table TB4 are L*a*b* values on/in the sphere R of FIG. 8.

So, for example, according to the process of Step F207, for example, the point P3, whose L*a*b* values are the closest to the L*a*b* values of the point P1 of FIG. 8, are searched for.

This process is repeated until the variable x=xmax is satisfied in Step F208 while the variable x is incremented in Step F209. xmax is the total number of the combinations of the negative signal L*a*b* table TB3, and is 1412 in this case.

In other words, the operation unit 61 searches the positive signal L*a*b* table TB4 for the combination of L*a*b* values, which is the closest to each combination of L*a*b* values of the negative signal L*a*b* table TB3. The operation unit 61 registers the combination of L*a*b* values, which is obtained as the result of the search, as each combination m0 to m1412 of the conversion L*a*b* table TB5 of FIG. 14.

The combination of L*a*b* values, with which the value obtained based on the color-difference formula ΔE* or ΔE*94 defined by CIE is the smallest, may be selected as the combination of L*a*b* values, which is the closest to each combination of L*a*b* values of the negative signal L*a*b* table TB3. (Math. 3) shows the color-difference formula ΔE*, and (Math. 4) shows the color-difference formula ΔE*94.

$$\Delta E^* = \sqrt{(\Delta L^*)^2 + (\Delta a^*)^2 + (\Delta b^*)^2} \qquad [\text{Math. 3}]$$

$$\Delta E^*_{94} = \sqrt{\left(\frac{\Delta L^*}{k_L \cdot S_L}\right)^2 + \left(\frac{\Delta C^*_{ab}}{k_C \cdot S_C}\right)^2 + \left(\frac{\Delta H^*_{ab}}{k_H \cdot S_H}\right)^2} \qquad [\text{Math. 4}]$$

$$S_L = 1$$

$$S_C = 1 + 0.045 \times \sqrt{C^*_{ab,1} \cdot C^*_{ab,2}}$$

$$S_H = 1 + 0.015 \times \sqrt{C^*_{ab,1} \cdot C^*_{ab,2}}$$

Note that, in those mathematical formulae, ΔL* is the difference between L* values, Δa* is the difference between a* values, and Δb* is the difference between b* values. Further, C*and H* are values of the so-called L*C*H*color system, in which C* is chroma and H* is hue.

C*and H* are calculated as follows.

$$C^* = \sqrt{a^{*2} + b^{*2}}$$

$$H^* = \arctan(b^*/a^*) \qquad [\text{Math.5}]$$

For example, when ΔE* of the above (Math. 3) is used, with regard to the combination m0 of the negative signal L*a*b* table TB3, ΔE* between the L* value, a* value, and b* value of the combination m0 of the negative signal L*a*b* table TB3 and all the combinations of the positive signal L*a*b* table TB4 are obtained.

In other words, ΔE* between the L*a*b* values of the combination m0 and the L*a*b* values of the combination p0, ΔE* between the L*a*b* values of the combination m0 and the L*a*b* values of the combination p1, . . . and ΔE* between the L*a*b* values of the combination m0 and the L*a*b* values of the combination p1030300 are calculated. Then, the smallest ΔE* between the combination m0 and one of the combination p0 to the combination p1030300 obtained as the result is selected. The L*a*b* values of the selected combination p are registered as the combination m0 of the conversion L*a*b* table TB5.

In Steps F206, F207, F208, and F209, the above-mentioned process is performed repeatedly to thereby obtain the combination m0 to the combination m1412. As a result, in the conversion L*a*b* table TB5 of FIG. 14, L*a*b* values at points on/in the sphere R of FIG. 8 are registered as the combination m0 to the combination m1412.

Next, in Step F210, the operation unit 61 converts the L*a*b* values of the combination m0 to the combination m1412 of the conversion L*a*b* table TB5 into RGB values, and registers the obtained RGB values for the combination m0 to the combination m1412 of the conversion R'G'B' table TB6.

FIG. 15 shows such a method. For example, the L* value, a* value, and b* value of the combination m0 are converted into RGB values, and the obtained RGB values are registered as the R' value, G' value, and B' value of the combination m0 of the conversion R'G'B' table TB6. The same applies to the combination m1 and thereafter. Since all the L*a*b* values registered in the conversion L*a*b* table TB5 are of points on/in the sphere R of FIG. 8, the values of all the combinations of the conversion R'G'B' table TB6 are 0 or positive. Note that the values of the conversion R'G'B' table TB6 are obtained by converting the L*a*b* values registered in the conversion L*a*b* table TB5 into RGB values.

Finally, in Step F211, as shown in FIG. 16, the operation unit 61 obtains 3×3 matrix coefficients based on the negative signal RGB table TB1 and the conversion R'G'B' table TB6 by the method of least squares.

$$\begin{bmatrix} R' \\ G' \\ B' \end{bmatrix} = \begin{bmatrix} a & b & c \\ d & e & f \\ g & h & i \end{bmatrix} \begin{bmatrix} R \\ G \\ B \end{bmatrix}$$ [Math. 6]

In other words, as shown in (Math. 6), a, b, c, d, e, f, g, h, and i are calculated, which are conversion coefficients between RGB values of the negative signal RGB table TB1 and R'G'B' values of the conversion R'G'B' table TB6.

As the result of the above-mentioned process, 3×3 matrix coefficients are obtained. In short, the thus-obtained 3×3 matrix coefficients are conversion coefficients that are used to obtain, for example, the point PT3 based on the RGB values at the point PT1 of FIG. 8, ΔE* between the points PT1 and PT3 being the smallest, the point PT3 having non-negative RGB values.

The 3×3 matrix coefficients are stored in the matrix coefficient memory 444 of the color gamut converter 44. The negative value converter 443 converts RGB values including a negative value/negative values into RGB values including no negative value by using the 3×3 matrix coefficients. As a result, it is possible to convert the color gamut appropriately by using the 3DLUT 452, in which no negative value is to be input. In addition, the change of hue at this time is minimized, and the gradation is not changed.

In other words, the size of the 3DLUT 452 is not increased, the accuracy of conversion is not decreased, at the same time, the color gamut is converted in high quality even if negative signal values are input, and colors displayed on a liquid crystal display are more accurate.

Modification Example 1

The second color gamut is not limited to the color gamut determined based on ITU-R BT. 709. Needless to say, the second color gamut may be a color gamut in the color gamut determined based on ITU-R BT. 2020, for example, such as a color gamut determined based on DCI P3 and a color gamut for a film.

Modification Example 2

In the above-mentioned embodiment, input image data having a color gamut obtained by using the three-chip imaging unit 20, which includes the color separation prism 22 having the wide color gamut supporting 4K images, is compressed to image data having a color gamut of ITU-R BT. 709 standard. The color gamut converter performs the compression with reference to the 3DLUT (3D lookup table). Alternatively, input image data having a color gamut obtained by using the three-chip imaging unit 20, which includes the color separation prism 22 having the wide color gamut supporting 4K images, may be compressed to image data having a color gamut of ITU-R BT. 2020 standard by a color gamut converter with reference to the similar 3DLUT (3D lookup table).

Alternatively, a color gamut may be converted not with reference to the 3DLUT. Alternatively, a color gamut may be converted by means of 3-input/3-output linear matrix conversion, 16-axes matrix conversion, or the like.

Modification Example 3

The above-mentioned embodiment relates to an imaging apparatus to which this technology is applied. Alternatively, this technology is applicable to an imaging system.

Figure 17:
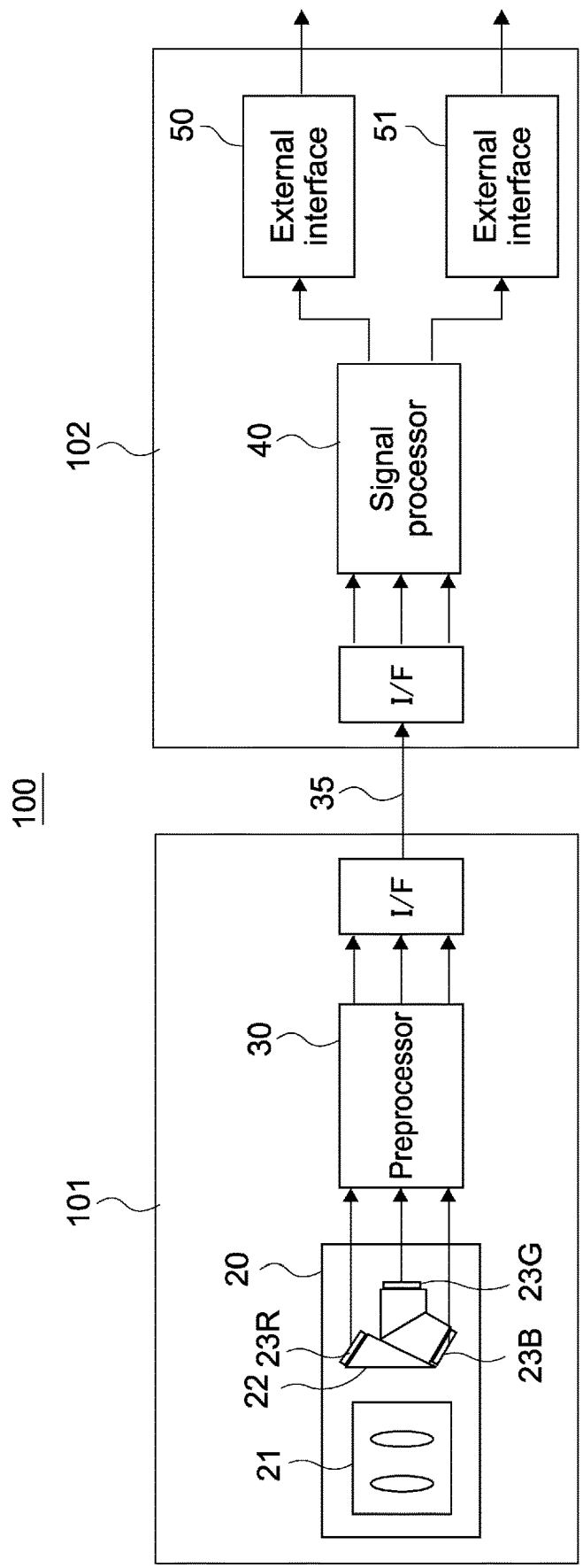
FIG. 17 is a block diagram showing an imaging system of an embodiment of this technology.

FIG. 17 is a block diagram showing the imaging system 100.

As shown in FIG. 17, the imaging system 100 includes the unit 101, the unit 102, and the transmission path 35. The unit 101 includes the three-chip imaging unit 20 and the preprocessor 30. The unit 102 includes the signal processor 40 and the two external interfaces 50 and 51. The transmission path 35 connects the unit 101 to the unit 102.

Figure 18:
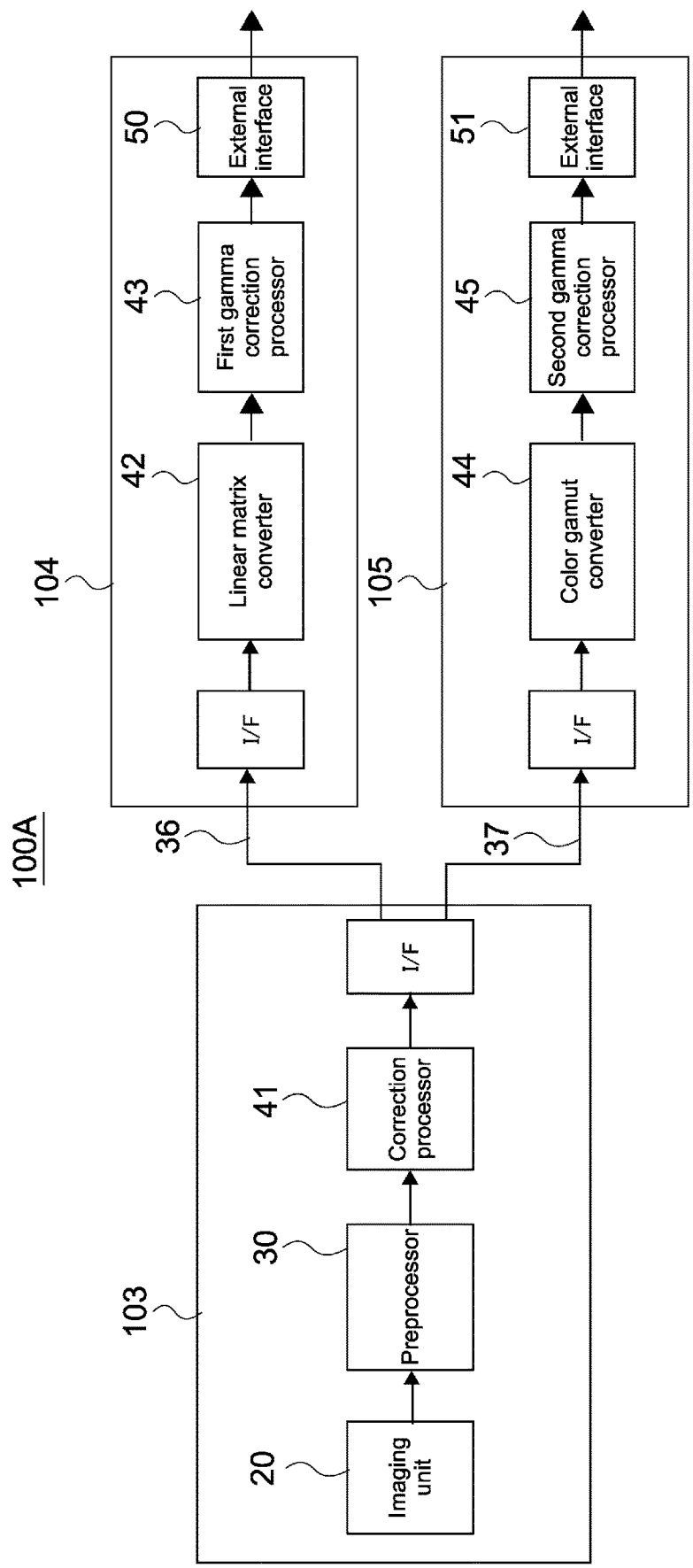
FIG. 18 is a block diagram showing another imaging system of an embodiment of this technology.

FIG. 18 is a block diagram showing the configuration of another imaging system 100A.

The imaging system 100A includes the unit 103, the unit 104, and the unit 105. The unit 103 includes the configuration from the imaging unit 20 to the correction processor 41 of the signal processor 40 of the imaging apparatus 1. The unit 104 includes the linear matrix converter 42, the first gamma correction processor 43, and the first external interface 50. The unit 105 includes the color gamut converter 44, the second gamma correction processor 45, and the second external interface 51. The output interface of the correction processor 41 of the unit 103 is connected to the unit 104 and the unit 105 via the two transmission paths 36 and 37, respectively.

According to the above-mentioned embodiment, an RGB three-chip imaging apparatus is used. This technology is applicable to a multi-chip imaging apparatus including four or more chips.

Note that this technology may have the following configurations.

(1) An imaging apparatus, including:
a multi-chip imaging unit including a color separation prism;
a first converter that generates image data having a first color gamut based on multi-color signals obtained by using the imaging unit, the first color gamut supporting spectral characteristics of the color separation prism; and
a second converter that generates image data having a second color gamut based on the multi-color signals obtained by using the imaging unit, the second color gamut being contained in the first color gamut.

(2) The imaging apparatus according to (1), further including:
interfaces capable of simultaneously outputting the image data having the first color gamut and the image data having the second color gamut.

(3) The imaging apparatus according to (1) or (2), further including:
a correction processor that
corrects the multi-color signals obtained by using the imaging unit, and supplies the corrected signals to the first converter and the second converter simultaneously.

(4) The imaging apparatus according to any one of (1) to (3), in which
the first color gamut is a color gamut determined based on ITU-R BT. 2020.

(5) The imaging apparatus according to (4), in which
the second color gamut is a color gamut determined based on ITU-R BT. 709.

(6) A signal processor including:
correction circuitry configured to correct a signal for each color input to the signal processor and to output the corrected signal for each color;
first conversion circuitry configured to receive the corrected signal for each color, to perform first image processing on each corrected signal for each color, and to generate a first signal having a first color gamut for each color;
second conversion circuitry configured to receive the corrected signal for each color, to perform second image processing on each corrected signal for each color, and to generate a second signal having a second color gamut for each color,
wherein the signal processor outputs a first image data having a first color gamut and a second image data having a second color gamut from same corrected signals for each color.

(7) The signal processor according to (6), further including:
a first gamma correction circuitry configured to perform gamma correction on the generated first signal having a first color gamut for each color,
wherein the first image data having the first color gamut is output by the first gamma correction circuitry.

(8) The signal processor according to any of (6)-(7), further including:
a second gamma correction circuitry configured to perform gamma correction on the generated second signal having a second color gamut for each color,
wherein the second image data having the second color gamut is output by the second gamma correction circuitry.

(9) The signal processor according to any of (6)-(8), wherein the correction circuitry is further configured to correct signals of each color input to the signal processor from a preprocessor.

(10) The signal processor according to any of (6)-(9), wherein the correction circuitry is further configured to correct signals of each color input by removing noise components.

(11) The signal processor according to any of (6)-(10), wherein the correction circuitry is further configured to correct signals of each color input by removing offset components.

(12) The signal processor according to any of (6)-(9), wherein the correction circuitry is further configured to correct signals of each color input by performing white balance correction.

(13) The signal processor according to any of (6)-(12), wherein the first color gamut of the first image data is ITU-R BT. 2020.

(14) The signal processor according to any of (6)-(13), wherein the second color gamut of the second image data is ITU-R BT. 709.

(15) The signal processor according to any of (6)-(14), wherein the signal processor simultaneously outputs the first image data having the first color gamut and the second image data having the second color gamut from the same corrected signals for each color.

(16) The signal processor according to any of (6)-(15), wherein the first image processing on each corrected signal for each color is a 3-input/3-output matrix operation.

(17) The signal processor according to any of (6)-(16), wherein the second image processing on each corrected signal for each color is performed using a 3D lookup table.

(18) The signal processor according to any of (6)-(17), wherein the first color gamut contains therein all colors of the second color gamut.

(19) The signal processor according to any of (6)-(17), wherein the first color gamut contains therein a majority of colors of the second color gamut.

(20) The signal processor according to any of (6)-(17), wherein the first color gamut is greater than the second color gamut.

(21) The signal processor according to any of (6)-(20), wherein the second image processing on each corrected signal for each color is further performed using negative signal processing circuitry configured to determine whether the corrected signal for each color is negative and to perform conversion process through an operation using 3×3 matrix coefficients stored in a matrix coefficient memory based on whether the image signal value for each color is negative.

(22) The signal processor according to any of (6)-(21), wherein the 3D lookup table is applied to the converted signal for each color having applied thereto the conversion process through the operation using 3×3 matrix coefficients.

(23) The signal processor according to any of (6)-(22), wherein the signal for each color, input to the signal processor, is obtained via a prism.

(24) A signal processing method implemented by a signal processor, comprising:
correcting, using correction circuitry, a signal for each color input to the signal processor and to output the corrected signal for each color;
performing, using first conversion circuitry, first image processing on each corrected signal for each color;
generating, using the first conversion circuitry, a first signal having a first color gamut for each color;
performing, using second conversion circuitry, second image processing on each corrected signal for each color;
generating, using the second conversion circuitry, a second signal having a second color gamut for each color,
wherein the signal processor outputs a first image data having a first color gamut and a second image data having a second color gamut from the same corrected signals for each color.

(25) A signal processor comprising:
input circuitry configured to receive light through a prism and generate a corresponding input signal;
a first processing path configured to output a first image data having a first color gamut based on the input signal; and
a second processing path configured to output a second image data having a second color gamut based on the input signal,
wherein the first color gamut of the first image data is ITU-R BT. 2020, and
wherein the second color gamut of the second image data is ITU-R BT. 709.

The present application contains subject matter related to that disclosed in Japanese Priority Patent Application JP 2015-079232 filed in the Japan Patent Office on Apr. 8, 2015, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 1 imaging apparatus
10 controller
20 imaging unit
21 optical block
22 color separation prism
23R, 23G, 23B image sensor
30 preprocessor
40 signal processor
41 correction processor
42 linear matrix converter
43 first gamma correction processor
44 color gamut converter
45 second gamma correction processor
50, 51 external interface
100, 100A imaging system

The invention claimed is:

1. A signal processor comprising:
 correction circuitry configured to correct an input image and to output a corresponding corrected image;
 first conversion circuitry in a first branch configured to receive the corrected image, to perform first image processing on the corrected image, and to generate a first signal having a first color gamut for the corrected image;
 second conversion circuitry in a second branch separate from the first branch configured to receive the corrected image, to perform second image processing on the corrected image, and to generate a second signal having a second color gamut for the corrected image; and
 interface circuitry configured to simultaneously output first image data corresponding to the first signal to a first external device that is external to the signal processor and second image data corresponding to the second signal to a second external device that is external to the image processing system, signal processor and separate from the first external device,
 wherein the interface circuitry outputs the first image data to the first external device and outputs the second image data to the second external device via a respective either 3G Serial Digital Interfaces or High Definition Serial Digital Interfaces.

2. The signal processor according to claim 1, further comprising:
 first gamma correction circuitry configured to perform gamma correction on the first signal to generate the first image data and output the first image data to the interface circuitry.

3. The signal processor according to claim 2, further comprising:
 second gamma correction circuitry configured to perform gamma correction on the second signal to generate the second image data and output the second image data to the interface circuitry.

4. The signal processor according to claim 1, wherein the correction circuitry is further configured to receive the input from a preprocessor.

5. The signal processor according to claim 4, wherein the correction circuitry is further configured to correct the input image by removing noise components.

6. The signal processor according to claim 5, wherein the correction circuitry is further configured to correct the input image by removing offset components.

7. The signal processor according to claim 4, wherein the correction circuitry is further configured to correct the input image by performing white balance correction.

8. The signal processor according to claim 1, wherein the first color gamut is ITU-R BT. 2020.

9. The signal processor according to claim 1, wherein the second color gamut is ITU-R BT. 709.

10. The signal processor according to claim 1, wherein the first image processing is a 3-input/3-output matrix operation.

11. The signal processor according to claim 1, wherein the second image processing is performed using a 3D look up table.

12. The signal processor according to claim 1, wherein the first color gamut contains therein all colors of the second color gamut.

13. The signal processor according to claim 1, wherein the first color gamut contains therein a majority of colors of the second color gamut.

14. The signal processor according to claim 1, wherein the first color gamut is greater than the second color gamut.

15. The signal processor according to claim 11, wherein the second conversion circuitry comprises:
 negative signal processing circuitry configured to determine whether the corrected image is negative and to perform a conversion process using 3×3 matrix coefficients stored in a matrix coefficient memory based on whether the corrected image is negative.

16. The signal processor according to claim 15, wherein the 3D lookup table is applied to a converted image having applied thereto the conversion process.

17. The signal processor according to claim 1, wherein input signals for each color of the input image are obtained via a prism.

18. A signal processing method comprising:
 correcting, using correction circuitry, an input image input to a signal processor;
 outputting, using the correction circuitry, the corrected image;
 performing, using first conversion circuitry in a first branch, first image processing on the corrected image;
 generating, using the first conversion circuitry, a first signal having a first color gamut for the corrected image;
 performing, using second conversion circuitry in a second branch different from the first branch, second image processing on the corrected image;
 generating, using the second conversion circuitry, a second signal having a second color gamut for the corrected image; and
 simultaneously outputting, using interface circuitry, first image data corresponding to the first signal to a first external device that is external to the signal processor and second image data corresponding to the second signal to a second external device that is external to the signal processor and separate from the first external device,
 wherein the simultaneously outputting comprising outputting the first image data to the first external device and outputting the second image data to the second external device via a respective either 3G Serial Digital Interface or High Definition Serial Digital Interfaces.

19. A signal processor unit comprising:
 input circuitry configured to receive an input image;
 a first processing path configured to externally output, to a first external device that is external to the signal processor unit, first image data having an ITU-R BT. 2020 color gamut, based on the input image; and a second processing path configured to externally output, to a second external device that is external to the signal processor, second image data having an ITU-R BT. 709 color gamut, based on the input image, wherein the first processing path externally outputs the first image data to the first external device and the second processing path externally outputs the second image data to the second external device simultaneously via a respective either 3G Serial Digital Interface or High Definition Serial Digital Interface.

\* \* \* \* \*